United States Patent [19]

Iwasawa et al.

[11] Patent Number: 5,244,612
[45] Date of Patent: Sep. 14, 1993

[54] METHOD FOR MOLDING POLYURETHANE SEAT PADDINGS

[75] Inventors: Toshio Iwasawa, Kanagawa; Kazushige Ebe; Takayoshi Morofuji, both of Yokohama, Japan

[73] Assignee: Bridgestone Corporation, Tokyo, Japan

[21] Appl. No.: 623,689

[22] Filed: Dec. 7, 1990

[30] Foreign Application Priority Data

Dec. 8, 1989 [JP] Japan .................. 1-319986

[51] Int. Cl.⁵ .............................. B29C 67/22
[52] U.S. Cl. .................. 264/46.5; 264/45.1; 264/46.6; 264/275; 264/278
[58] Field of Search ............ 264/45.1, 46.4, 46.5, 264/46.6, 48, 275, 278

[56] References Cited

U.S. PATENT DOCUMENTS

| | | | |
|---|---|---|---|
| 3,320,339 | 5/1967 | Smith | 264/45.1 |
| 3,393,258 | 7/1968 | Fultz et al. | 264/45.1 |
| 3,393,259 | 7/1968 | Trogdon | 264/45.1 |
| 3,825,647 | 7/1974 | Kirsch | 264/278 |
| 3,918,863 | 11/1975 | Rhodes, Jr. | 425/117 |
| 3,971,112 | 7/1976 | Amato et al. | 264/46.6 |
| 4,923,746 | 5/1990 | Balmisse et al. | 264/45.1 |
| 5,061,419 | 10/1991 | Kouda et al. | 264/46.6 |

FOREIGN PATENT DOCUMENTS 58-112715 7/1983 Japan.
1244284 8/1971 United Kingdom.

*Primary Examiner*—Allan R. Kuhns
*Attorney, Agent, or Firm*—Birch, Stewart, Kolasch & Birch

[57] ABSTRACT

A polyurethane seat padding having a center seat portion and a bank portion on either side thereof is molded by using a mold defining a cavity having a center region corresponding to the center seat portion and side regions corresponding to the bank portions, placing collecting vessels of expanded polypropylene or polyethylene in the side regions of the mold cavity, pouring a foaming polyurethane liquid for flexible foam into the cavity between the collecting vessels, pouring a foaming polyurethane liquid for rigid foam into the collecting vessels, and causing the foaming liquids to expand, thereby producing a polyurethane seat padding having the collecting vessels embedded therein.

8 Claims, 8 Drawing Sheets

LIQUID B    LIQUID A    LIQUID B

LIQUID B  LIQUID A  LIQUID A  LIQUID A  LIQUID B

METHOD FOR MOLDING POLYURETHANE SEAT PADDINGS

This invention relates to a method for molding polyurethane seat paddings for use as automobile seats, and more particularly, to a method for molding polyurethane seat paddings having a center seating portion and bank or raised portions on opposite sides thereof or along the periphery thereof having a different hardness from the center region.

BACKGROUND OF THE INVENTION

In these days, seats for automobiles and other vehicles are often manufactured by furnishing polyurethane seat paddings each having a center seating portion and a pair of bank or raised portions on opposite sides thereof and covering the paddings with shells or covers. Some polyurethane seat paddings have uniform hardness throughout, but polyurethane seat paddings in which the bank portions are harder than the seating portion are more popular for their stable support to the human body and the improved aesthetic appearance of finished covers.

In the prior art, a number of methods are known for preparing polyurethane seat paddings having bank portions of higher hardness. Some typical prior art methods are described with reference to FIGS. 15 and 16. A polyurethane seat padding having a center seating portion and opposed bank portions of higher hardness than the seating portion is manufactured by a method as illustrated in FIG. 15 using a mold 11 which defines a cavity including a center region 12 corresponding to the seating portion and side regions 13 and 13 corresponding to the bank portions. Weir members 14 are provided at the boundary between the center region 12 and the side regions 13. Liquid A which is a foaming raw material for producing a low hardness foam is poured into the center region 12 and liquid B which is a foaming raw material for producing a high hardness foam is poured into the side regions 13. Then the liquids are expanded.

The method of FIG. 16 is a modified version of the method of FIG. 15 in that metallic or resinous partitions 15 and 15 are added to the mold 11. Metallic partitions 15 and 15 are integrally formed with the mold 11 such that the partitions stand on the bottom of the side regions 13 and 13. Alternatively resinous or partitions 15 and 15 of expanded resin are disposed in the mold 11 in a similar manner. Liquid A and B are poured to the inside and the outside of the partitions 15 and 15, respectively. In the case of metallic partitions, partitions are removed from the padding at the end of expansion process. In the case of resinous partitions, they are left in the padding because partions are joined to the polyurethane foam.

These methods for preparing polyurethane seat paddings having bank portions of higher hardness, however, have the following problems.

The padding manufactured by the method of FIG. 15 is shown in the cross section of FIG. 17. The bank portion 16 has high hardness throughout the section thereof. When one sits on this padding, the thigh comes in contact with the hard bank portion which is less comfortable to sit on. In addition, separation can occur at the interface between high and low hardness foams.

The padding manufactured by the method of FIG. 16 is shown in the cross sections of FIGS. 18 and 19. Where metallic partitions are used, the bank portion 16 at the top has a channel 17 from which the partition has been removed as shown in FIG. 18. Where partitions of expanded resin are used, the bank portion 16 at the top has the partition 15 embedded therein as shown in FIG. 19. When one sits on such a padding, the channel 17 or the partition 15 can be perceived as a foreign part which is less comfortable to sit on. Also failure can occur at the interface between high and low hardness foams.

Moreover, in the method of FIG. 16, part of liquids A and B can overrun the partitions 15 to move into the adjoining portions during expansion so that the interface between high and low hardness foams becomes indefinite, leading to a potential variation in quality. Since liquid B cannot fully spread to the rear side of the padding (which is depicted at 18 in FIGS. 18 and 19), problems arise with respect to the supporting ability and cover finishing.

Further, it is difficult to control the pouring of liquids A and B. Unless liquids A and B are poured in well controlled timing, either one of the liquids would flow over the partitions into the adjoining region in an unacceptable amount, failing to produce a quality padding.

Another method is disclosed in Balmisse et al., U.S. Pat. No. 4,923,746 or Japanese Patent Application Kokai No. 25008/1988. Polyurethane foam paddings are produced by placing vessels of expanded polystyrene against the opposed side walls of a mold cavity, pouring liquid B into the vessels and liquid A into the remaining cavity, and causing contraction of the vessels by external heating or exothermic reaction of the foams, thereby interconnecting the polyurethane foams of liquids A and B. This method is successful in improving comfortable seating, supporting ability, and cover finishing, but still has several drawbacks.

(1) A foaming raw material or liquid B normally contains an organic solvent such as methylene chloride as a foaming agent. When such a foaming raw material is poured into the vessel of expanded polystyrene, the organic solvent, typically methylene chloride can dissolve the vessel of expanded polystyrene in a moment so that the foaming liquid will run off the vessel, spoiling the vessel's purpose of separating liquid B from liquid A. Even if the foaming liquid does not run off, the organic solvent will soften the vessel to such an extent that the vessel may not retain its shape until the end of foaming. In either case, paddings cannot be molded in a stable manner.

In ordinary part molding procedures, a source material is introduced into the mold through a nozzle which is cleaned with an organic solvent such as methylene chloride on every shot of the source material. The organic solvent used for the cleaning purpose can impair the vessel.

(2) The method in question includes the step of thermally contracting the vessel. The thermally contracted vessel preferably has the same flexibility as polyurethane foam. However, an expanded polystyrene which is formulated to provide such flexibility after thermal contraction is low in strength and less self-sustaining before thermal contraction so that vessels formed therefrom will often fail to retain their shape upon pouring of foaming liquid. In turn, if vessels are formed from an expanded polystyrene which is formulated to be self-sustaining upon pouring of foaming liquid therein and during foaming, they can become too hard and brittle through thermal contraction. Such hard and brittle vessels will injure flexibility and elasticity required for paddings and tend to crack or fracture under an external force or deformation.

SUMMARY OF THE INVENTION

Therefore, an object of the present invention is to provide a method for producing a polyurethane seat padding having a center seat portion and opposed bank portions having higher hardness than the center region, in which collecting vessels having approximately the same flexibility and feel as the padding are used, the area of the bank portions which is to fit against the thigh is made softer, the top of the bank portions is free of channels or partitions associated with the molding process, different foaming raw materials can exert their own properties, and hard and soft portions can be joined together firmly such as to define a distinct interface therebetween in a consistent manner. Another object of the present invention is to provide a method for producing a polyurethane seat padding which ensures comfortable seating.

According to the present invention, there is provided a method for molding a polyurethane seat padding having a center seat portion and a bank portion on either side thereof or along the periphery thereof using a mold defining a cavity having a center region corresponding to the center seat portion and side regions corresponding to the bank portions, comprising the steps of: placing collecting vessels of expanded polypropylene or expanded polyethylene in the side regions of the mold cavity; pouring a foaming polyurethane liquid material for producing a low hardness foam into the cavity between the collecting vessels; pouring a foaming polyurethane liquid material for producing a high hardness foam into the collecting vessels; and causing the foaming liquids to expand, thereby producing a polyurethane seat padding having the collecting vessels embedded therein.

According to the invention, collecting vessels of expanded polypropylene or expanded polyethylene are placed in the side regions of the mold cavity, a foaming polyurethane liquid material for producing a low hardness foam is poured into the cavity between the collecting vessels, and a foaming polyurethane liquid material for producing a high hardness foam is poured into the collecting vessels. Then the foaming polyurethane liquid for producing a low hardness foam can enter the cavity side regions at the bottom or below the collecting vessels. Consequently, the inside and top areas of the bank portion which are to fit against the thigh when one sits on the padding are formed of the same low hardness foam as the center seat portion. The bank portion does not give an undesirable hard feel at the thigh when the thigh contacts the bank portion. Since the collecting vessels are left in the outside area of the bank portions of the padding, but not at the top thereof, one sitting on the padding will not physically feel the presence of the vessels left therein. Since the vessels prevent intermixing of the different foaming liquids before and during expansion and intervene between the high and low hardness foams after expansion, the interface between the high and low hardness foams is definitely created at the desired location, resulting in articles or paddings of consistent quality.

The collecting vessels are made of expanded polypropylene or expanded polyethylene, which assists in the bonding and interconnection of the hard and soft foams. The vessels of expanded polypropylene or polyethylene have a good balance of rigidity and flexibility and are resistant to cracking and fracture, so that they may maintain satisfactory elasticity at all times and give no feel as a foreign member even when embedded in the articles or paddings, while allowing the foam expanded therein to exert its own properties. In addition, since the collecting vessels of expanded polypropylene or polyethylene are stable against organic solvents such as methylene chloride, they impose no particular limitation on the formulation of foaming source liquids, particularly on the amount of an organic solvent foaming agent such as methylene chloride, allowing the use of desired foaming source liquid for the bank portions. Thus the resulting articles or paddings reflect the properties of the foams in the respective portions.

The contour and position of the boundary between the high and low hardness foams can be controlled as desired by a proper choice of the size, thickness, shape, and position of the collecting vessels. This means that the supporting ability and other features of the padding can be controlled without modifying the mold. By increasing the volume of the collecting vessels, a more amount of foaming liquid can be poured into the collecting vessels. All these factors alleviate the precision requirements imposed on the timing of pouring foaming liquids and the amount of foaming liquid charged.

BRIEF DESCRIPTION OF THE DRAWINGS

The above and other objects, features, and advantages of the present invention will be better understood from the following description taken in conjunction with the accompanying drawings, in which.

Like parts are designated by the same reference numerals throughout the figures.

DESCRIPTION OF THE PREFERRED EMBODIMENT

Figure 1:
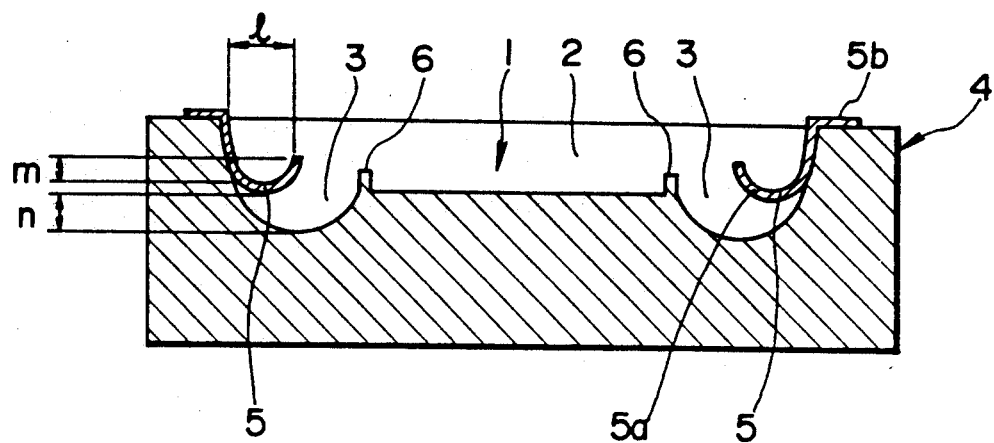
FIG. 1 is a schematic cross section of a mold used in the practice of the present invention.
Figure 2:
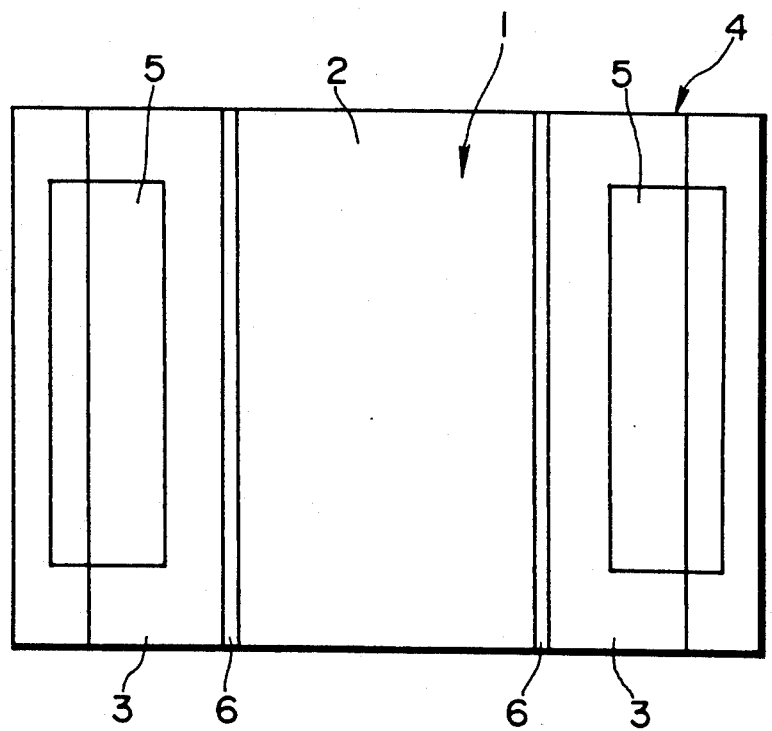
FIG. 2 is a plan view of the mold of FIG. 1.

Referring to FIGS. 1 and 2, there is illustrated a mold arrangement for use in the practice of the present invention. The mold 4 for foam molding defines a cavity 1 having a center region 2 corresponding to the center seat portion of the seat padding and opposed side regions 3 corresponding to the bank portions. In the cross section of FIG. 1, the center region 2 has a generally flat bottom surface and the side regions 3 each have a concave surface recessed relative to the center region and an outer side wall extending therefrom. Collecting vessels 5 of expanded polypropylene or polyethylene are attached to the outer wall of the side regions 3. Weir plates 6 are provided at the boundary between the center region 2 and the side regions 3.

Figure 3:
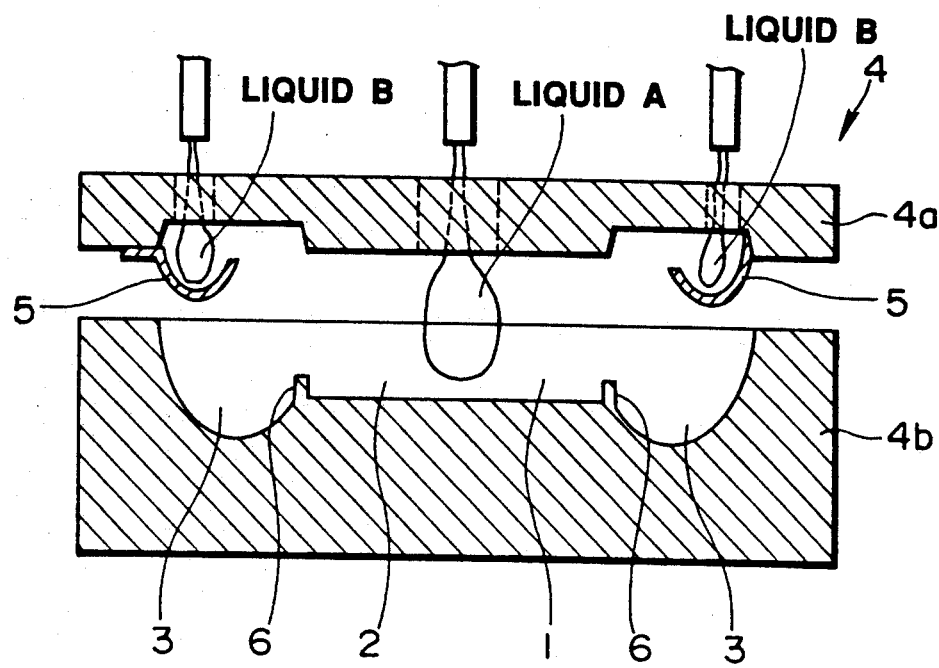
FIG. 3 is a schematic cross section of a mold used in another embodiment of the present invention.

The foaming mold used herein is not limited to the mold of FIGS. 1 and 2 having side regions 3 at the opposite sides of the center region 2. For example, a mold having an additional side region at the front or rear side of the center region in addition to the opposed side regions may be used. In such a case, an additional collecting vessel may be provided for the front or rear side region. A further example of the useful mold is shown in FIG. 3 as a closed mold 4 consisting of upper and lower molds 4a and 4b. Collecting vessels 5 are affixed to the upper mold 4a at opposite ends.

Figure 4:
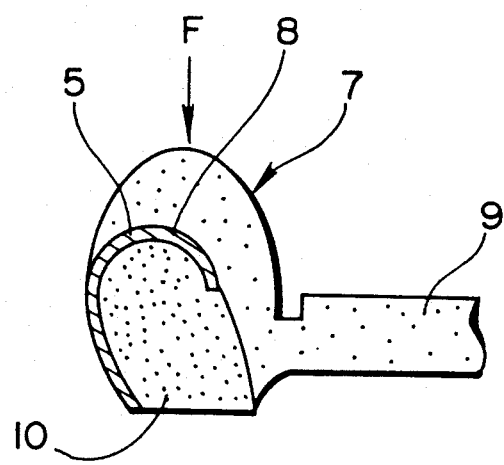
FIGS. 4 and 5 are fragmentary cross-sectional views of the paddings produced by the present invention.
Figure 5:
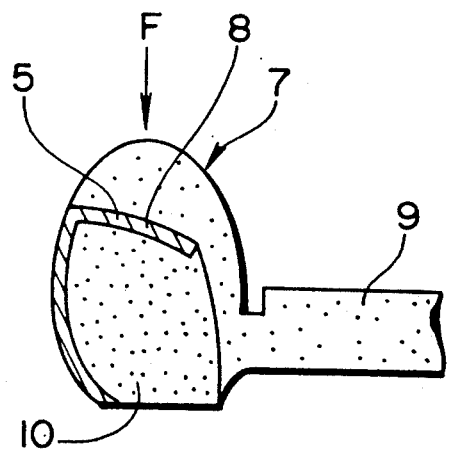

The shape of the collecting vessel 5 is not particularly limited insofar as it can receive some amount of liquid therein. A continuously curved vessel or a vessel having an arcuate bottom is preferred for the following reason. FIG. 4 shows a seat padding 7 molded using a vessel 5 having an arcuate bottom or a hollow hemisphere shape and FIG. 5 shows a seat padding 7 molded using a vessel 5 having a flat bottom. Provided that a boundary layer 8 resulting from the vessel has the same width and volume in both cases, the structure of FIG. 4 is more resistant against an external force F than the structure of FIG. 5, providing higher supporting ability.

The collecting vessel 5 is preferably one having a liquid collecting trough 5a and a bracket 5b connected thereto as shown in FIG. 1 because the vessel can be readily attached to the mold through the bracket.

Figure 10:
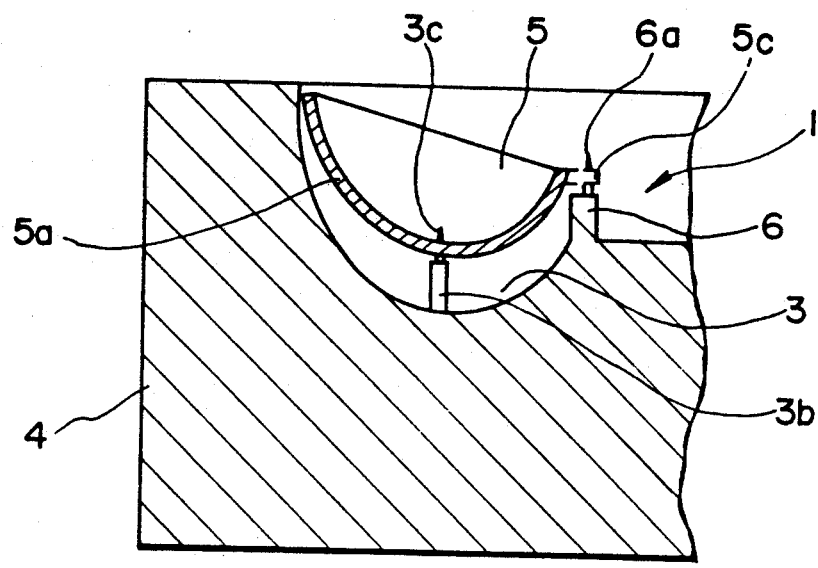
FIGS. 8, 9, 10 and 11 illustrate the attachment of the vessel to the mold, FIG. 8 being a fragmentary plan view, FIG. 9 being a cross section taken along lines IX—IX in FIG. 8, and FIGS. 10 and 11 being cross sections similar to FIG. 9, but showing other embodiments.
Figure 6:
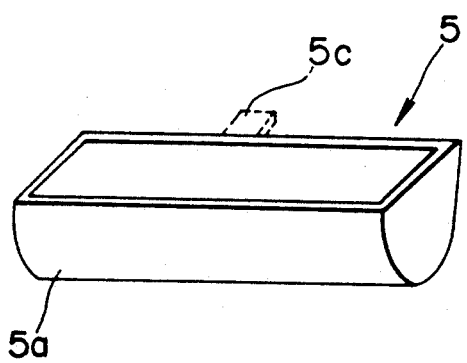
FIGS. 6 and 7 are perspective views of different examples of the collecting vessel used in the practice of the present invention.
Figure 7:
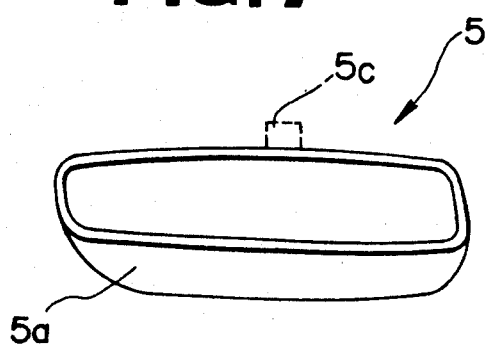
Figure 8:
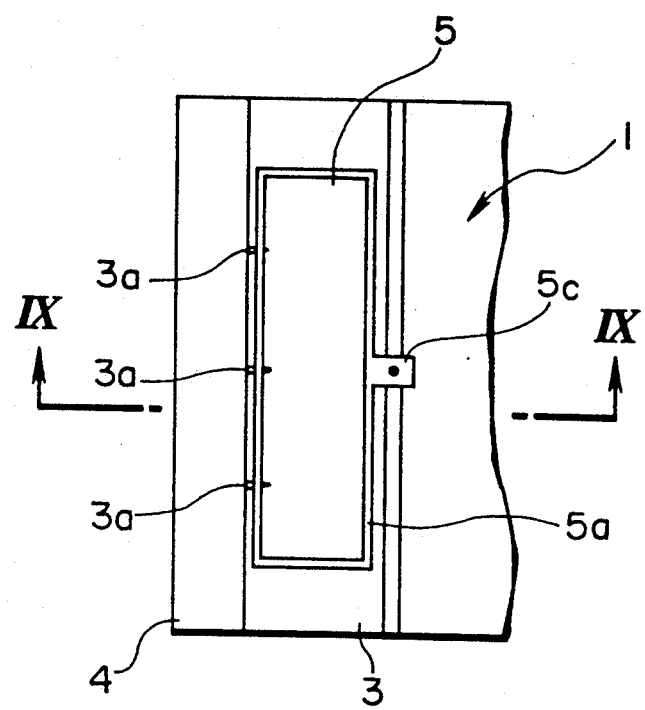
Figure 9:
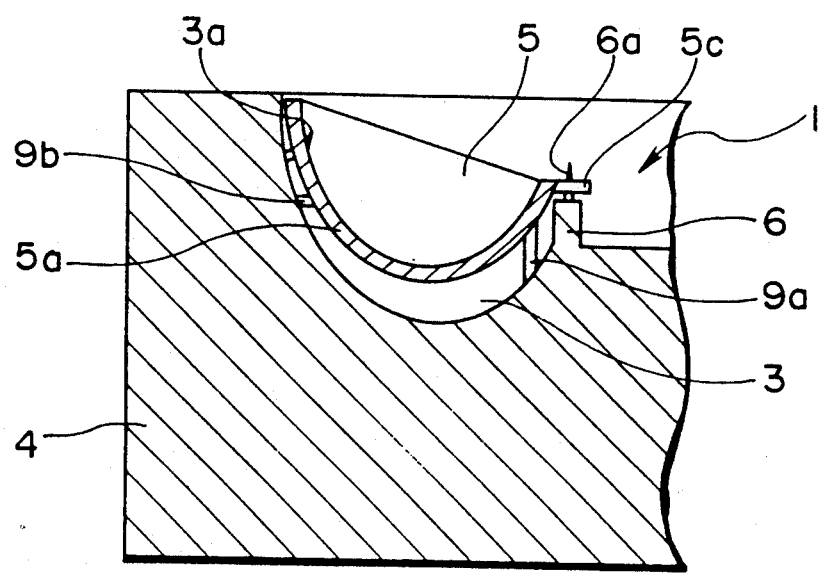

FIGS. 6 and 7 illustrate different collecting vessels each consisting essentially of a liquid collecting trough 5a with an optional tab 5c projecting therefrom. Such a vessel is attached to the mold using pins, clips or other fastening means. FIGS. 8 and 9 show the manner of placement of a trough-shaped vessel in the mold cavity. The trough-shaped vessel 5 on one side is supported by mounting pins 3a arranged on the outer wall of the mold cavity side region 3 and on the other side by the engagement of the tab 5c with a pin 6a anchored to the weir plate 6. FIG. 10 shows another manner of placement wherein the trough-shaped vessel 5 is supported by an upright strut 3b extending from the side region 3 at the bottom. More particularly, a pin 3c anchored to the top of the strut 3b is engaged with the vessel 5 at the bottom by extending through a hole in the vessel wall. If the vessel 5 has a mounting tab 5c, the vessel 5 on the inner side is supported by the engagement of the tab 5c with a pin 6a on the weir plate 6 in the same manner as in FIG. 7.

Figure 11:
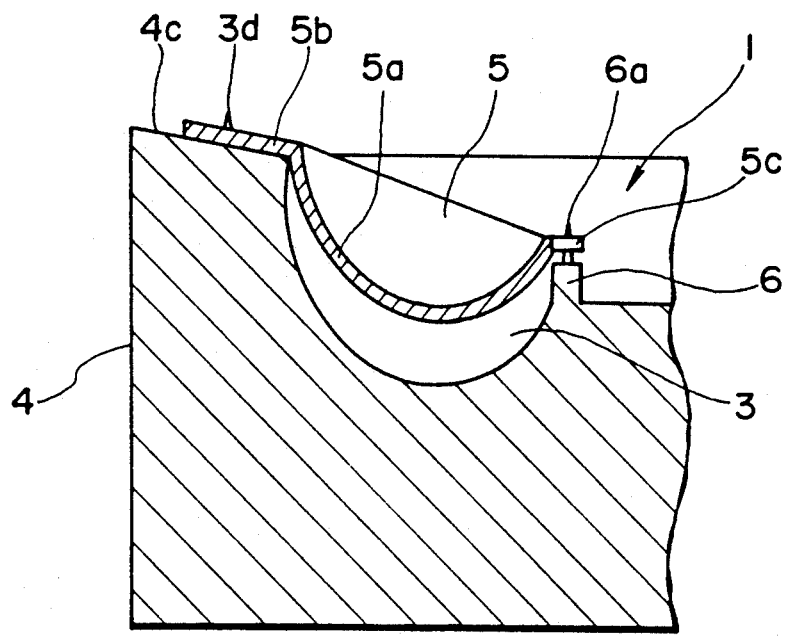

FIG. 11 illustrates another collecting vessel 5 having a liquid collecting trough 5a, a bracket 5b and an optional tab 5c. The vessel 5 is placed in the mold cavity side region 3 by engaging the bracket 5b with a pin 3d on a mating portion 4c of a lower mold 4 and engaging the tab 5c with a pin 6a on a weir plate 6. Since the expanded poly-propylene or polyethylene forming the vessel 5 is very flexible, a mold assembly can be closed in a tight seal manner even if the bracket 5b is interposed between the mating portions of the upper and lower molds (the upper mold not shown).

Figure 12:
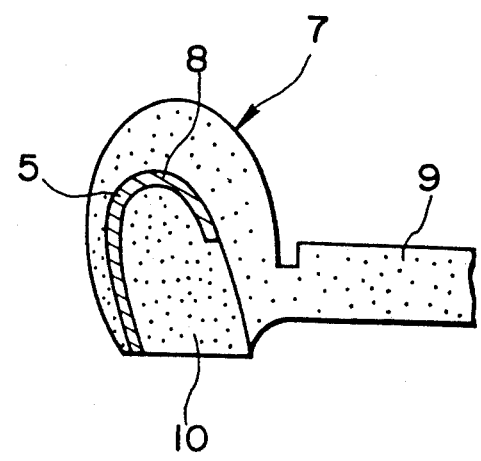
FIG. 12 is a fragmentary cross-sectional view of a further example of the padding produced by the present invention.

It is possible to place the vessel 5 in the side region 3 at a spacing from the outer wall within the confines of the mold cavity. The spacing of the vessel 5 from the outer wall of the cavity side region 3 results in a padding as shown in FIG. 12 in which the vessel 5 is not exposed on the exterior side of the padding 7. Where it is desired to place the vessel in the cavity side region at a spacing from the outer wall, a strut 9a and/or 9b may be disposed between the vessel and the cavity wall as shown in FIG. 9 for preventing any undesirable displacement or contact with the cavity side wall of the vessel 5. Since the mounting pins 3a, 6a and struts 3b, 9a and 9b are needle-shaped or slender rods, they will not leave large holes or channels in the padding which would adversely affect the comfortableness of seating.

Referring to FIG. 1 again, preferred dimensions of the collecting vessel 5 are described. The collecting trough 5a of the vessel has a width 1 which is 20 to 100%, preferably 40 to 80% of the entire width of the side region 3, a depth m which is 10 to 100%, preferably 30 to 80% of the entire depth of the side region 3, and a thickness of 1 to 6 mm, preferably 1 to 4 mm. Improved supporting ability is expected with these ranges of dimensions. For similar reasons, the vessel 5 is attached to the cavity side region 3 such that the distance n between the side region bottom and the vessel bottom ranges from 0 to 6 cm, preferably from 1 to 6 cm, more preferably from 2 to 6 cm. The expanded polypropylene or polyethylene of which the vessel is made preferably has a density of 0.01 to 0.1 $g/cm^3$, more preferably 0.03 to 0.06 $g/cm^3$.

The collecting trough of the vessel preferably has a volume of 0.8 to 2.5 liters. Productivity improvements are expected because the precision required for the timing of pouring foaming liquids and the amount of foaming liquid charged are reduced. The opposite surfaces of the vessel may be roughened or embossed to provide irregular surfaces having an increased surface area, ensuring that the vessel is joined to the urethane foams at increased bond strength.

Figure 13:
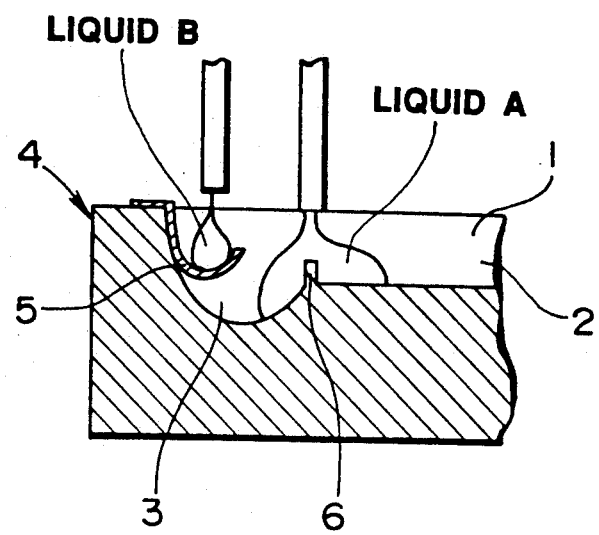
FIGS. 13 and 14 illustrate how to pour foaming liquids into the mold cavity.
Figure 14:
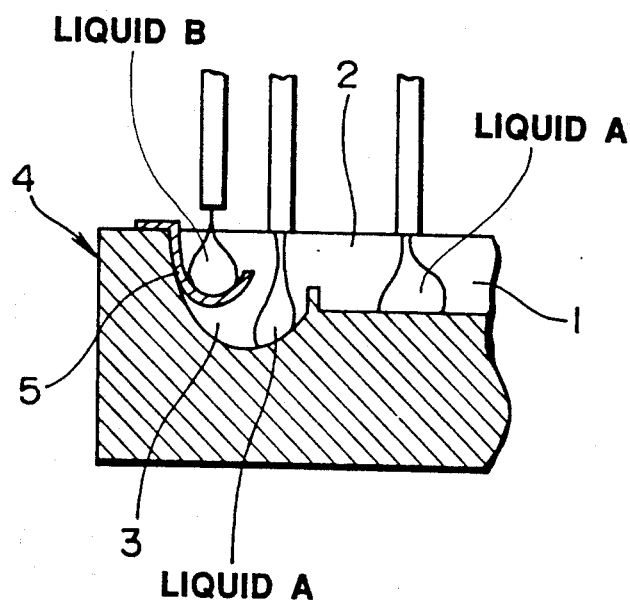
Figure 15:
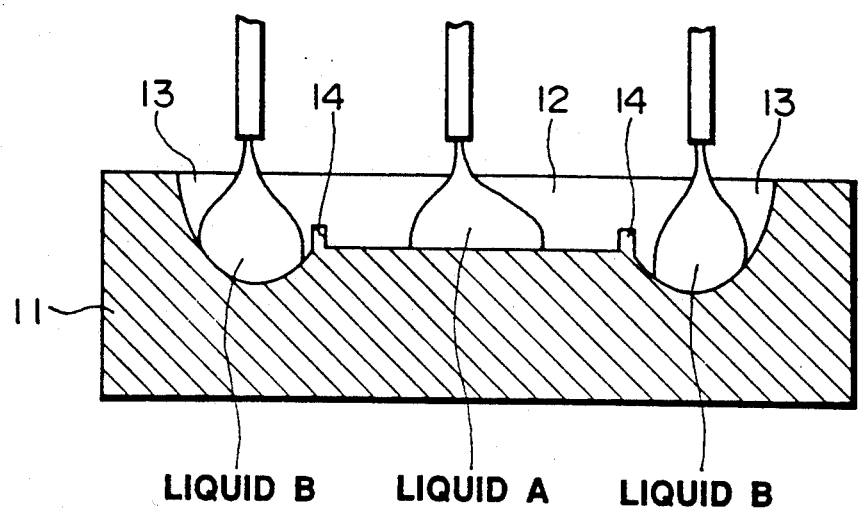
FIGS. 15 and 16 are schematic cross sectional views of mold arrangements for illustrating prior art methods.
Figure 16:
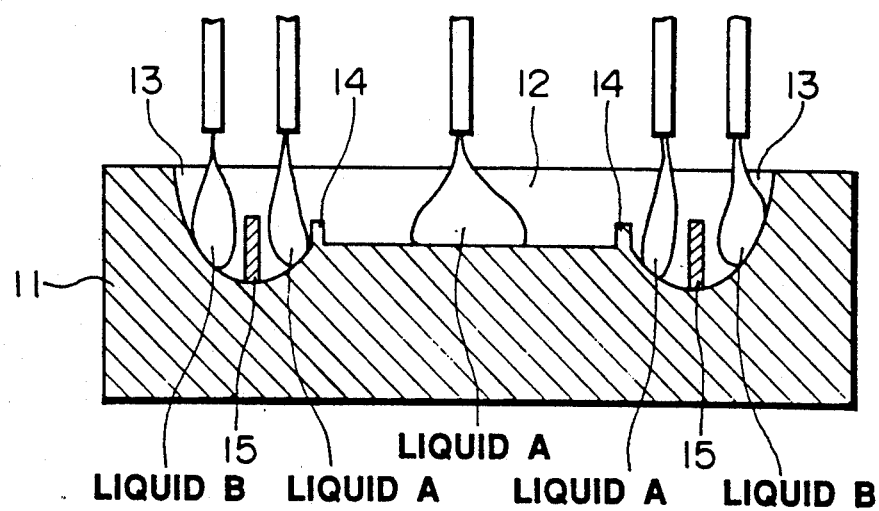
Figure 17:
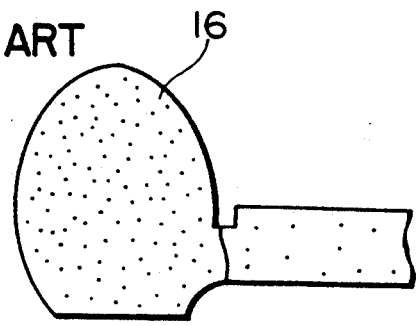
FIGS. 17, 18, and 19 are fragmentary cross-sectional views of the paddings produced by the prior art methods.
Figure 18:
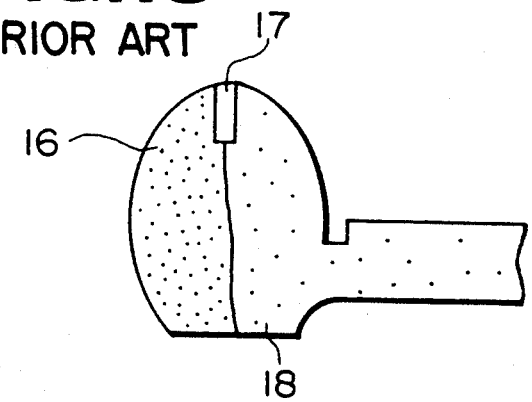
Figure 19:
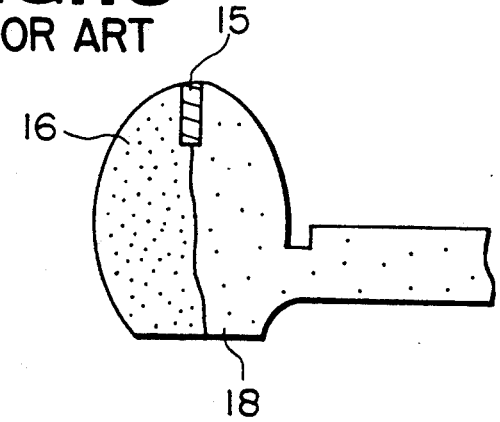

With the mold arranged in the above-described manner, a foaming polyurethane liquid for producing a low hardness foam (to be referred to as liquid A, hereinafter) is poured into the cavity between the collecting vessels, and a foaming polyurethane liquid for producing a high hardness foam (to be referred to as liquid B, hereinafter) is poured into the collecting vessels. The liquids A and B are then caused to expand. More particularly, liquid A may be poured from above the weir 6 to flow to both the center and side regions 2 and 3 as shown in FIG. 13, if desired. Alternatively, liquid A may be separately poured to the center and side regions 2 and 3 as shown in FIG. 14.

The foaming polyurethane liquids which can be used herein are of conventional compositions well known as foamable charges for flexible, semi-rigid and rigid polyurethane foams. Most often, a polyurethane composition capable of producing foamed articles having a hardness of 10 to 20 kg/200 mm diameter is selected for liquid A, and a polyurethane composition capable of producing foamed articles having a hardness of 1.8 to 4.0 kg/200 mm diameter is selected for liquid B, both as measured by a push-pull gage (manufactured by Aiko Engineering K.K.).

As described above, by placing collecting vessels of expanded polypropylene or expanded polyethylene in the side regions of the mold cavity, pouring liquid A into the cavity between the collecting vessels, pouring liquid B into the collecting vessels, and causing the liquids to expand, there is obtained a molded article or seat padding in which rigid and flexible foams are firmly joined while establishing a stable definite interface therebetween and in which the foams can exert their own properties at their positions. The padding is comfortable to sit on.

More particularly, liquid A or foaming polyurethane liquid for producing a low hardness foam can enter the cavity side regions at the bottom or below the collecting vessels. Consequently, the inside and top areas of the padding bank portion which are to fit against the thigh when one sits on the padding are formed of the same low hardness foam as the center seat portion. The person will not feel hardness at the thigh when the thigh contacts the bank portion. Since the collecting vessels are left in the outside area of the padding bank portions, but not at the top thereof, the person sitting on the padding will not physically feed the presence of the vessels left therein. Since the vessels prevent intermixing of liquids A and Be before and during foaming and intervene between the flexible and rigid foams after foaming a distinct interface is established between the flexible and rigid foams at the desired location, resulting in articles or paddings of consistent quality.

The collecting vessels made of expanded polypropylene or expanded polyethylene assist in providing an integral junction between the high and low hardness foams. The vessels of such material have a good balance of rigidity and flexibility and are resistant to cracking and fracture, so that they may maintain satisfactory elasticity at all times and give no feel as a foreign member even when embedded in the articles or paddings, while allowing the foam expanded therein from liquid B to exert its own properties. Since the vessels are resistant against organic solvents, any desired foaming source material can be used without a limitation on its composition. Thus the resulting articles or paddings reflect the properties of the foams in the respective portions. The use of expanded polyethylene as the vessels has an additional advantage of cost reduction as compared with the prior art method using vessels of expanded polystyrene.

The method for molding polyurethane seat paddings according to the present invention is not limited to the above-mentioned embodiments. For example, although one liquid collecting vessel is placed in each side region of the mold cavity in the illustrated embodiments, two or more vessels may be placed in each side region if necessary. Then the same or different foaming liquids may be poured into these plural vessels. The shape of the vessel and mold cavity may vary from the illustrated ones without departing from the scope of the invention.

The method of the invention has the following benefits.

(1) The seat padding molded thereby is comfortable to sit on because the inside and top areas of the bank portion which are to come in contact with the thigh are flexible.
(2) The seat padding gives no rugged feel to the person because the vessels left therein are imperceptible at the exterior.
(3) The substantial intermixing of high and low hardness foam-forming polyurethane liquids is avoided. A definite boundary is always established between the high and low hardness foam portions at the desired position. There are produced seat paddings of consistent quality.
(4) The high and low hardness foam portions are firmly joined into a one-piece seat padding.
(5) The supporting ability and other features of the seat padding can be controlled by a proper choice of the size, thickness, shape, and position of the collecting vessels.
(6) The precision requirements imposed on the timing of pouring foaming liquids and the amounts of foaming liquids charged are alleviated by increasing the volume of the collecting vessels. Productivity is improved.
(7) Benefits (5) and 6) are obtained simply by changing the shape of the vessels without modifying the mold.
(8) The seat padding has a definite contour based on the rigid side edge portions, which contributes to an improvement in the finishing appearance of the cover fitted on the padding.
(9) The solvent resistant vessels allow any desired foaming source material to be used without a limitation on its composition, resulting in seat paddings which reflect the properties of the foaming liquid charged in the vessels.
(10) The vessels which are resistant against creasing maintain elasticity, ensuring comfortable seating in service.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method for molding a polyurethane seat padding having a center seat portion and a bank portion on either side thereof or along the periphery thereof using a mold defining a cavity having a center region corresponding to the center seat portion and side regions corresponding to the bank portions, comprising the steps of:

placing collecting vessels of expanded polypropylene or expanded polyethylene having a density of 0.01 to 0.1 $g/cm^3$ and an arcuate bottom in the side regions of the mold cavity so that the collecting vessels can receive a foamable polyurethane liquid, pouring a foaming polyurethane liquid for producing a low hardness foam into the cavity between said collecting vessels, pouring a foamin polyurethane liquid for producing a high hardness foam into said collecting vessels, and causing the foaming liquids to expand, whereby said collecting vessels prevent intermixing of said two foaming polyurethane liquids before and during expansion thereof, and said collecting vessels intervene between said high and low hardness foams after expansion such that a stable definite interface is created therebetween.

2. The method of claim 1, wherein each of said collecting vessels is supported in said side region of the mold cavity by a bracket attached to said collecting vessel and resting on a mating portion of said mold.

3. The method of claim 2, wherein said mating portion of said mold includes a pin which engages a hole in said bracket of the collecting vessel.

4. The method of claim 2, wherein each of said collecting vessels is equipped with a tab projecting from said collecting vessel and each of said collecting vessels is supported in said side regions of the mold cavity by mounting pins arranged on an outer wall of said mold cavity, and by said tab engaging an anchor pin anchored to a weir plate which forms an inner wall of said side region of the mold cavity.

5. The method of claim 2, wherein said side regions of the mold cavity contain a strut and a pin anchored on top of said strut such that said pin engages a hole in said collecting vessel.

6. The method of claim 2, wherein said collecting vessels are spaced from cavity walls of said side regions of the mold cavity by needle-shaped or slender rods which prevent undesirable displacement of said collecting vessels or contact between said collecting vessels and said cavity walls without leaving large holes or channels in said polyurethane seat padding.

7. The method of claim 2, wherein said foamable polyurethane liquid for producing a low hardness foam is poured separately into said center seat portion of said mold cavity and into said side regions of said mold cavity adjacent said collecting vessels.

8. The method of claim 2, wherein said expanded polypropylene or expanded polyethylene has a density of 0.03 to 0.06 g/cm$^3$.

* * * * *